US005615559A

United States Patent [19]
Kress et al.

[11] Patent Number: 5,615,559
[45] Date of Patent: Apr. 1, 1997

[54] METHOD AND APPARATUS FOR RECIRCULATING PRODUCT IN A REFRIGERATION SYSTEM

[75] Inventors: John E. Kress, Waterloo; James W. Griffin, Fort Atkinson, both of Wis.

[73] Assignee: APV Crepaco Inc., Rosemont, Ill.

[21] Appl. No.: 396,553

[22] Filed: Mar. 1, 1995

[51] Int. Cl.⁶ .................................................. A23G 9/00
[52] U.S. Cl. ........................... 62/68; 62/136; 62/348
[58] Field of Search ............................ 62/342, 348, 68, 62/136

[56] References Cited

U.S. PATENT DOCUMENTS

| | | |
|---|---|---|
| 1,742,171 | 12/1929 | Vogt . |
| 1,934,283 | 11/1933 | Thompson . |
| 2,263,794 | 11/1941 | Wyen . |
| 2,594,442 | 4/1952 | Irwin . |
| 2,784,565 | 3/1957 | Stalkup ............................. 62/348 X |
| 2,896,421 | 7/1959 | Rader ................................ 62/348 X |
| 2,975,617 | 3/1961 | Wakeman . |
| 3,037,748 | 6/1962 | Wakeman . |
| 3,214,146 | 10/1965 | Wakeman et al. . |
| 3,829,242 | 8/1974 | Duke et al. . |
| 4,129,389 | 12/1978 | Wakeman et al. . |
| 4,793,151 | 12/1988 | Masel et al. . |
| 4,850,205 | 7/1989 | Mills . |
| 5,016,446 | 5/1991 | Fiedler . |
| 5,024,066 | 6/1991 | Goavec . |
| 5,074,125 | 12/1991 | Schifferly . |
| 5,158,506 | 10/1992 | Kusano et al. . |
| 5,201,861 | 4/1993 | Menzel . |
| 5,277,037 | 1/1994 | Gram . |
| 5,292,030 | 3/1994 | Kateman et al. . |

*Primary Examiner*—William E. Tapolcai
*Attorney, Agent, or Firm*—Leydig, Voit & Mayer, Ltd.

[57] ABSTRACT

A freezing system for processing frozen edible product includes a freezing section, an inlet section, a product discharge section, and a recirculation section that selectively recycles processed product through at least a portion of the outlet section back to the freezing section.

16 Claims, 4 Drawing Sheets

METHOD AND APPARATUS FOR RECIRCULATING PRODUCT IN A REFRIGERATION SYSTEM

FIELD OF THE INVENTION

This invention relates to apparatus and methods used in the continuous production of edible product in refrigeration systems, and more particularly, to methods and apparatus for recirculating processed frozen product through outlet sections of the apparatus and reprocessing the product during selected operations of the system.

BACKGROUND OF THE INVENTION

Conventional refrigeration systems used in the production of frozen desserts and the like typically include a freezing cylinder that receives unfrozen product mix from an inlet section and provides processed product through an outlet section to a filler. In order to process the product mix, the freezing cylinder is initially filled with unfrozen mix. The refrigeration system surrounding the freezing cylinder is started. When the freezing cylinder is filled, a dasher assembly in the freezing cylinder is started so that blades attached to the dasher assembly scrape the freezing cylinder wall to introduce ice crystals formed on the cylinder wall with the product mix.

The viscosity of the product mix increases as its temperature decreases and ice crystals are scraped from the freezing cylinder wall. The increased viscosity is detected by monitoring the load on the dasher motor. When the dasher motor-load rises to a predetermined level, forward flow of the dessert mix begins. In particular, dessert mix and air is supplied under pressure into the freezing cylinder. At the same time, frozen dessert from the freezing cylinder exits to the outlet section and then to processing equipment downstream of the freezing cylinder.

One of the problems associated with known refrigeration systems occurs during a start-up operation of the system or at other instances where the temperature of product lines downstream from the freezing is too high. Otherwise, the viscosity and other characteristics of the processed product is unacceptable for consumption. Accordingly, conventional wisdom dictates that processed frozen dessert must initially be diverted to nonproductive containers when forward flow of product commences until the product lines are sufficiently cooled and product consistency is acceptable to the operator. Thus, a substantial amount of product must be diverted to a rework station due to the improper temperature of the product lines. Inasmuch as various separate processing steps are required for reconditioning the product prior to refreezing, in many instances the product is simply discarded.

In addition, the frozen dessert is either diverted for reconditioning or is destroyed when forward flow of the system is interrupted and then restarted. This may be necessitated, for example, when intervention is required for correcting problems with subsequent packaging stations or with other equipment downstream from the freezing system. In some instances, the product line must be shut down completely and restarted, again resulting in unacceptable loss of product.

SUMMARY OF THE INVENTION

Accordingly, known systems now result in inefficiencies in production. It is therefore an object of the present invention to overcome the deficiencies of the prior art.

It is another object of the present invention to provide minimal product loss in a refrigeration system.

It is an additional object of the present invention to substantially reduce the amount rework of processed product in a refrigeration system.

The present invention provides these and other additional objects and advantages with a freezing system that includes a freezing section having a freezing section inlet and an outlet that processes product mix, an inlet section coupled with the freezing section inlet, an outlet or discharge section coupled with the freezing section outlet and a recirculation section. The recirculation section is coupled with the outlet section and the freezing section inlet and, when operating in a selected mode such as a startup mode, recycles processed product after it has been drawn through the outlet section back to the freezing section inlet. At other times, the inlet section provides product mix to the freezing section which is processed by the freezing section. The processed product is then supplied via the outlet section to downstream locations.

During the recirculation mode, approximately 100 percent of the product mix may be recirculated and reprocessed by the freezing section of the system. Inasmuch as operating parameters of the freezing section may be controlled, the product density and viscosity of the product mix may be controlled when in the recirculation mode. In this way, the freezing section and components in the outlet section are filled with food product which is recirculated until a desired temperature is attained in the outlet section of the system. In addition, processed product may be recirculated from the outlet section back to the freezing section inlet in other operating conditions, such as, for example, when downstream packaging equipment is rendered inoperative. In this way, significant amounts of wasted ice-cream are eliminated.

In a preferred embodiment, the inlet section of the system includes a product mix pump that supplies product mix to the freezing section inlet so that a desired pressure is maintained in the freezing section. The outlet section likewise includes a product discharge pump that controls product flow through the freezing cylinder. The product mix pump may be implemented as a low cost centrifugal-type pump when the product discharge pump is located in close relation to the freezing section outlet.

DETAILED DESCRIPTION OF THE PREFERRED EMBODIMENTS

Generally, the present invention relates to a refrigeration system for processing frozen edible product that includes a freezing section, an inlet section, an outlet or product discharge section, and a recirculation section. The recirculation section selectively recycles processed product by passing the product through at least a portion of the outlet section and returning the product back to the freezing section for reprocessing. This arrangement enables cooling of the outlet section components while recycling the processed product, particularly during startup of the system or at another desired time, to avoid waste of processed product. In this way, the need for reworking the product is eliminated. Thereafter, processed product may be discharged to further stations.

The system is intended for particular use in connection with processing frozen or semi-frozen dessert products such as ice-cream, or other frozen dairy products which are provided as a product mixture and typically aerated to achieve a desired consistency when processed. However, the system may be utilized in other applications where various components of a refrigeration system must be brought to a selected temperature prior to operation of the system with appropriate modification. Accordingly, the term "frozen product" is used in the broadest sense herein and refers to any product that is processed by refrigeration.

Figure 1:
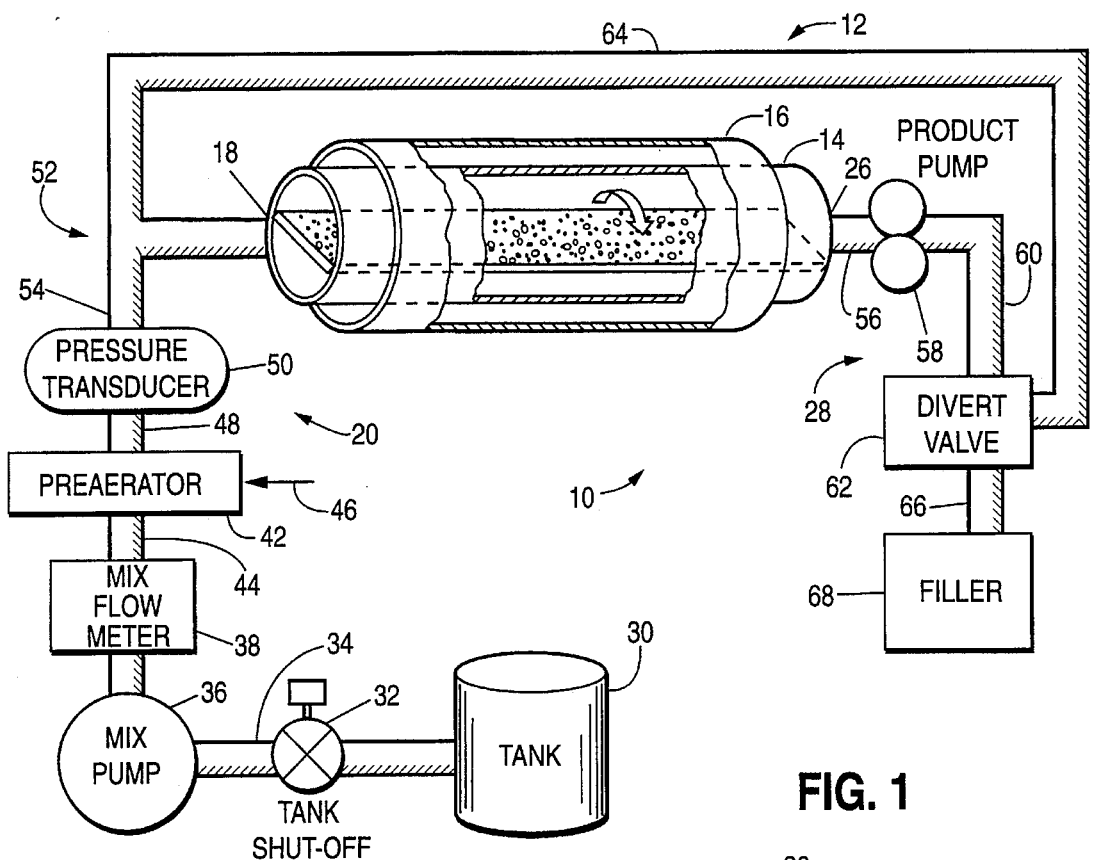
FIG. 1 is a block diagram representation of a refrigeration system for processing frozen edible product according to the present invention.

FIG. 1 is a block diagram of a refrigeration system 10 having a recirculation arrangement 12 according to the present invention. The refrigeration system 10 includes a freezing cylinder 14 surrounded by refrigeration apparatus 16 as will be generally known to those skilled in the art. The freezing cylinder 14 includes a freezing cylinder inlet 18 that receives unprocessed product mix from an inlet section 20. The freezing cylinder 14 also includes a dasher element shown schematically as element 22 disposed within the freezing cylinder.

In operation, the freezing cylinder is filled with product mix. The dasher element 22 is then rotated by a dasher motor (denoted as numeral 24 in FIG. 2) to stir the product mix contained in the freezing cylinder while the product is cooled. The dasher element 22 also scrapes ice crystals from the interior surface of the freezing cylinder so that the viscosity of the product is increased as will be understood by those skilled in the art. Processed frozen product is thereafter available via a freezing cylinder outlet 26 at an outlet section 28. In this way, the freezing cylinder processes the edible product.

The inlet section 20 includes a product mix tank 30 which supplies product mix through a tank shutoff valve 32 to conduit denoted by a line 34. The product mix is provided on line 34 to a mix pump 36 and thereafter to a mix flow meter 38 via a line 40. The mix flow meter 38 may be implemented as a mass flow meter which provides appropriated sensing signals (as explained below) so that the flow of product mix may be closely monitored. The product mix is thereafter provided to a preaerator 42 via conduit denoted by a line 44. The preaerator 42 also receives a selected amount of air which is metered thereto from an air input line 46. The preaerator operates in a known fashion to mix the selected amount of air with the product mix. The aerated product mix or overrun is provided via conduit denoted by a line 48 to a pressure transducer 50 that senses the input line pressure. The product mix is then applied through a T-type connection 52 via a line 54 and thereafter to the inlet 18 of the freezing cylinder. In this way, the freezing cylinder pressure is controlled.

The discharge section 28 also includes conduit represented by a line 56 which receives exiting product provided the freezing cylinder outlet 26. The frozen or processed product passes through conduit 56 under control of an output or product discharge pump 58. The product discharge pump 58 is preferably a positive displacement type pump that is operated in response to a variable speed drive to control the product mix flow through the freezing cylinder 14 and the discharge section. The processed product is then supplied through conduit shown as an output line 60 to a three-way divert valve 62. Alternatively, other similar valve systems may be used in place of the three-way divert valve 62 such as, for example, two single-seat valves.

The recirculation arrangement 12 includes the divert valve 62 which selectively diverts the frozen product to a recirculation conduit 64. The recirculation conduit 64, in turn, is coupled with the freezing cylinder inlet 18 via the T-connection 52 at its other end. In this way, the processed product may selectively be recycled back to the freezing cylinder inlet 18 when desired such as, for example, during a startup operation of the system. Alternatively, the divert valve 62 may be set to supply the frozen product to further processing stations via conduit represented by a line 66. By way of example, the frozen product may be supplied to a filler processing station 68. Alternatively, other ingredients may be added to the frozen product with an ingredient filler prior to introduction to the filler station 68 as will be understood by those skilled in the art. When an ingredient filler is utilized, the recirculation arrangement is located upstream of the filler.

One of the advantages of the particular embodiment of the present invention described herein is that the mix pump 36 may be implemented as a centrifugal pump. This arrangement significantly reduces the overall cost of the system. In this embodiment, the mix flow meter 38 is utilized to monitor the flow of the product mix so that appropriate compensation may be provided for any slippage due to the pressure differential between the input and output of the mix pump 36. On the other hand, the product discharge pump 58 is a positive displacement pump preferably located in close proximity to the freezing cylinder outlet 26.

Alternatively, the mix pump 28 may also be implemented as a positive displacement pump when greater precision in the operation of the system is desired. This embodiment eliminates the necessity for the mix flow meter 30 in the input section since adequate information signals relating to product mix flow pressure may be obtained from signals provided by the positive displacement pump.

Figure 2:
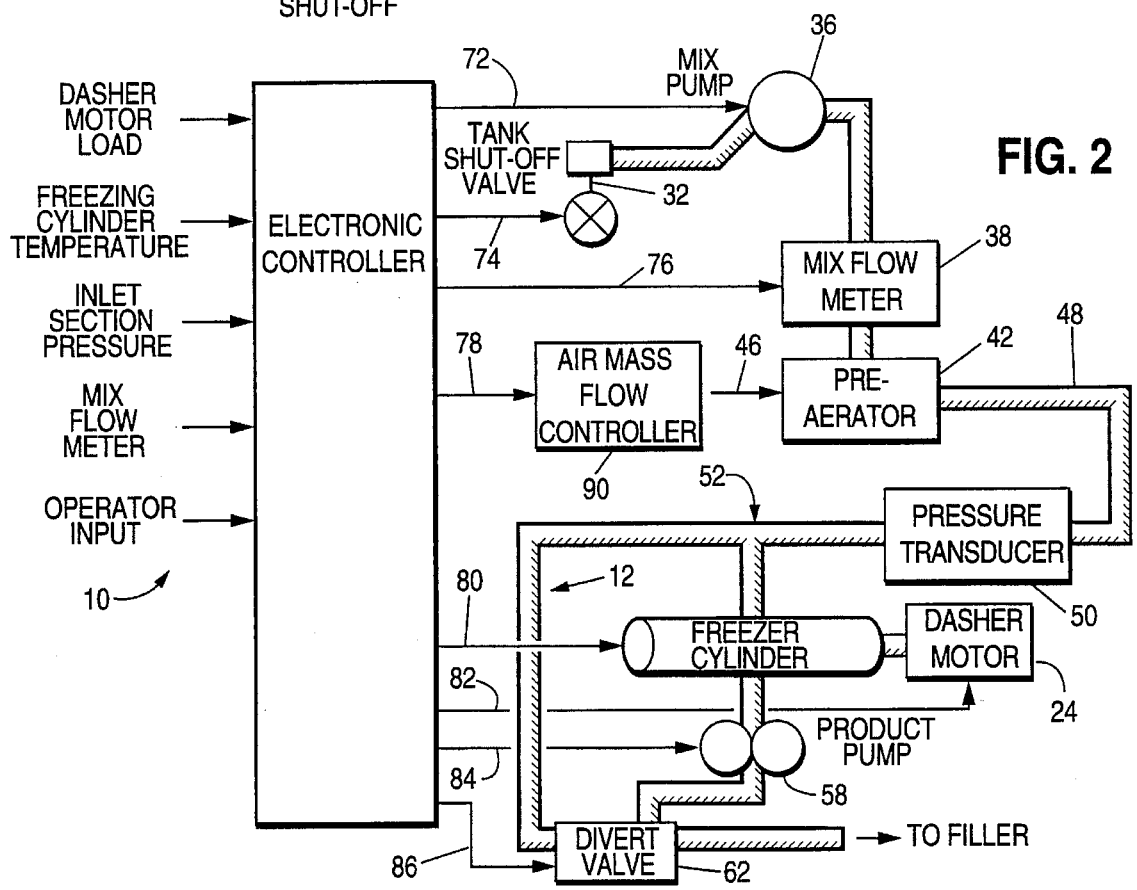
FIG. 2 is an electrical block diagram representation of various components in the system shown in FIG. 1.

FIG. 2 is an electrical block diagram illustrating a preferred control scheme for the freezing system 10. As shown therein, the freezing system 10 may operate under control of a electronic programmable logic controller 70. In operation, the electronic controller 70 receives dasher motor load, freezing cylinder temperature, inlet section pressure, mix flow meter and other information input signals as shown at the left of FIG. 2. The electronic controller 70 operates in a logical fashion to provide a mix pump control signal on a line 72, a tank shut-off valve control signal on a line 74, a product mix flow meter control signal on a line 76, an air mass flow control signal on a line 78, a freezing system control signal on a line 80, a dasher motor control signal on a line 82, a product discharge pump control signal on a line 84, and a recirculation divert valve control signal on a line 86.

The signal on the line 74 to the tank shut-off valve enables product mix flow from the mix tank supply. The signal on line 78 is provided in response to the mix flow meter input information signals and pressure input signals provided to the electronic controller 70 and controls an air mass flow controller 90. The air mass flow controller provides via line 46 a desired air quantity to the pre-aerator so that overrun of the product mix is controlled. Alternatively, where the mix pump is a positive displacement pump, the controller 70 may process an output signal indicative of overrun pressure from the mix pump to provide the control signal on line 78.

The signals on lines 72 and 84 control operation of the product mix pump and product discharge pump, respectively. The signal provided to the mix pump on line 72 controls the freezing cylinder pressure. During production, the controller 70 provides the signal on line 84 based on the mix flow meter and inlet section pressure signals to control the mix flow rate through the system. As noted above, the product discharge pump is actuated by a variable speed drive to closely control mix flow rate. The signal on line 80 controls operation of refrigeration apparatus 16 surrounding the freezing cylinder. Similarly, the signal on line 86 controls operation of the recirculation divert valve.

Figure 3:
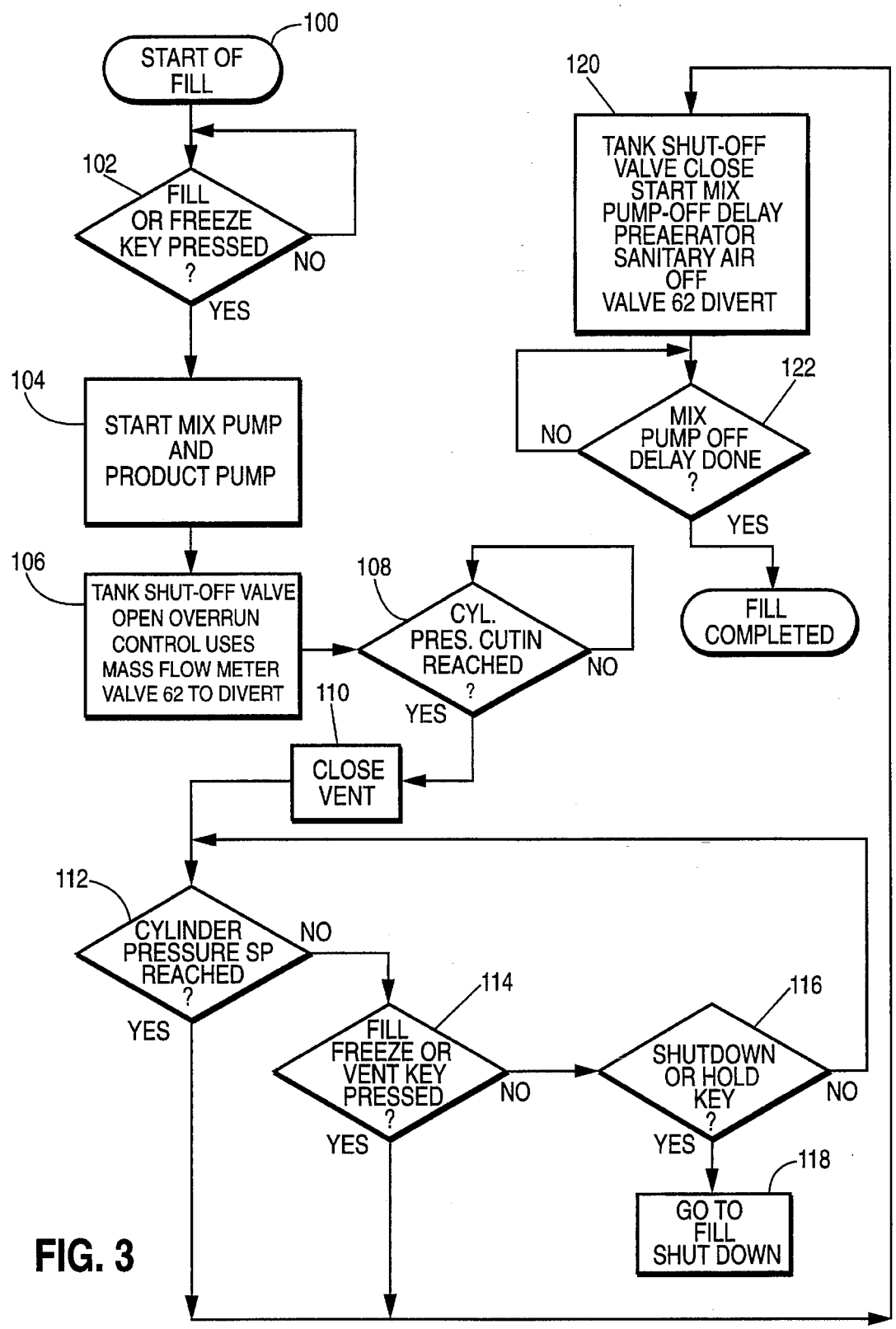
FIG. 3 is a logical flow diagram for operation of a refrigeration system in a FILL mode according to the present invention.

FIG. 3 is a logical flow diagram depicting the sequence of operation for a FILL cycle of the freezing system 10. As shown therein, the system begins at a block 100 and then advances to a decision block 102 and determines whether appropriate input information is provided to the system to initiate a FILL operation. If yes, the system advances to a block 104 and provides appropriate control signals to actuate the mix pump. Preferably, the mix pump is actuated so that it ramps up to a desired setpoint. This is determined based on information signals received from the mix flow meter. The product discharge pump is also initiated at a predetermined speed.

The system then advances to a next block 106 where the tank shut-off valve 32 is opened. At the same time, air is metered into the input line and is rationed in accordance with the output from the mix flow meter. The preaerator is also actuated and the air mix flow controller 90 provides a selected amount of air thereto based on information input signals provided to the controller by the mix flow meter 38. The controller 70 also provides appropriate control signals to set divert valve 62 to the recirculation mode in order to recirculate product mix exiting the freezing cylinder and outlet section of the system back to the freezing section inlet. At the same time, any trapped air in the system is vented through a vent valve (not shown) as will be understood by those skilled in the art.

The system then determines at a decision block 108 whether a freezing cylinder pressure threshold has been established by monitoring the input information signal provided by the pressure transducer 50. When a predetermined pressure is established, the system advances to a next block 110 and closes the vent valve. The system then advances to a decision block 112 and determines whether the freezing cylinder pressure setpoint has been obtained. Since the mix pump attempts to control the mix flow at a predetermined flow rate and the system is closed, the mix pump stuffs the system until the predetermined cylinder pressure is reached. Thus, if at decision block 112 the desired cylinder pressure is not obtained, the system advances to a decision block 114 and determines whether the same operation input request is present. If no, the system advances to a decision block 116 and determines whether the operator has requested a system shutdown or hold operation. If yes, the system advances to a block 118 and initiates a shutdown operation. Typically, the shutdown operation involves various cleaning and venting operations as will be understood by those skilled in the art.

If, on the other hand at decision block 112, the system determines that the freezing cylinder pressure setpoint has been reached, the system advances to a next block 120 and closes the tank shut-off valve 32. The system also begins a delay interval to deactuate the mix pump 36. In addition, the appropriate control signals are provided to deactuate the air supplied on line 46 and the preaerator 42. The divert valve 62 is maintained in the divert position. The system then advances to a decision block 122 and determines whether the mix pump delay interval has elapsed. If yes, the mix pump is deactuated and the FILL cycle is completed.

Figure 4:
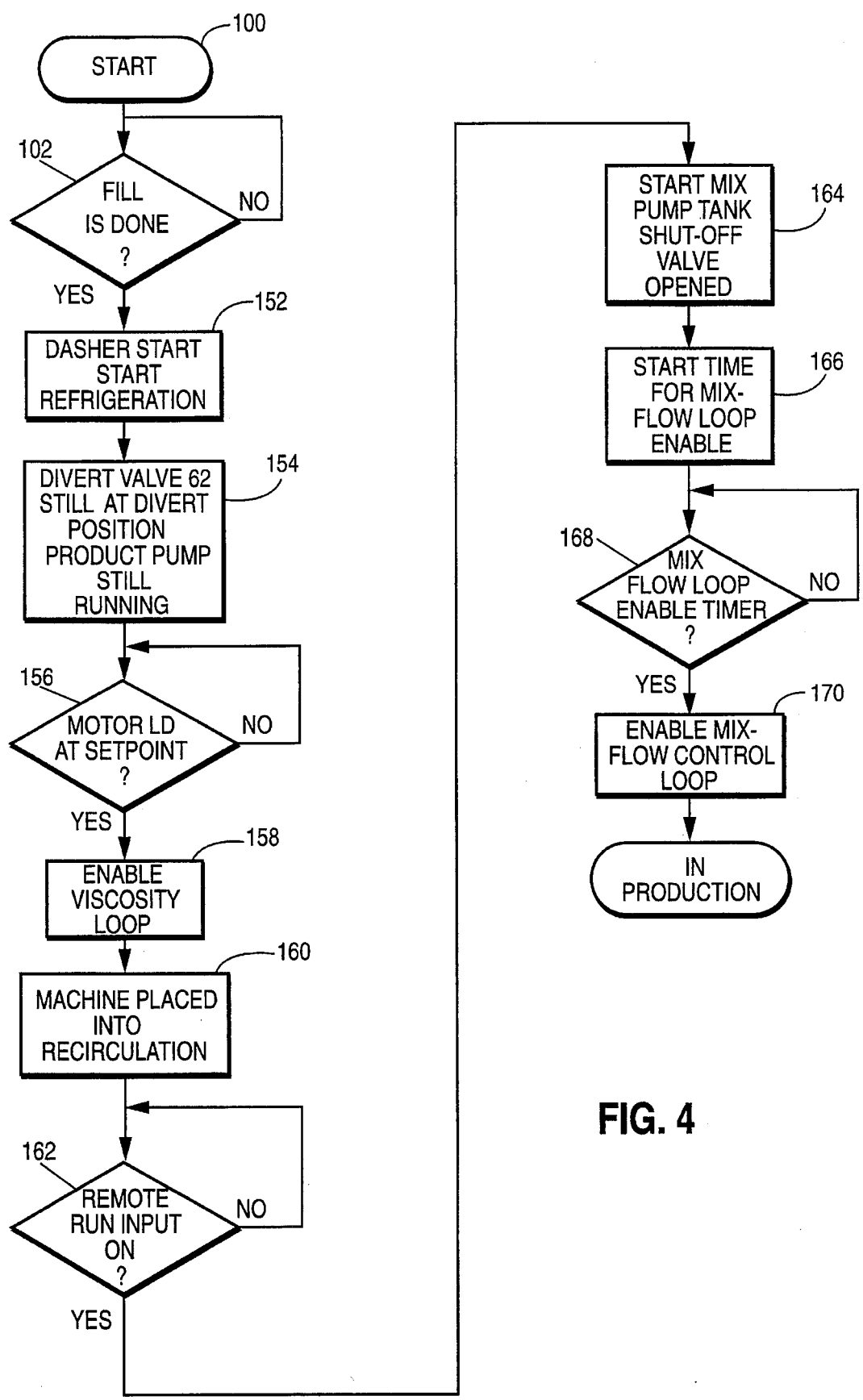
FIG. 4 depicts a logical flow diagram for operation of a refrigeration system in a PROCESS or FREEZE mode.

FIG. 4 is a logical flow diagram showing the operation of FREEZE and RUN cycles. As shown therein, the system first advances to a decision block 150 and determines whether the freezing cylinder is filled with product mix.

If the system determines the FILL cycle has completed, the system then advances to a block 152 where the electronic controller supplies appropriate control signals to actuate the dasher motor 24 so that the blades of the dasher element scrape the inside of the freezing cylinder wall. The system also initiates the refrigeration apparatus surrounding the freezing cylinder and the processing of the product mix within the freezing cylinder is commenced.

The system then advances to a block 154 and maintains operation of the product discharge pump at the selected speed. At the time, the divert valve 62 is set to the recirculation mode to recycle the processed product mix from the discharge or freezing section outlet through the product lines of the outlet section and back to the freezing cylinder inlet.

The freezing cylinder processes the mix by increasing the viscosity thereof in the freezing cylinder as more ice crystals are formed. In this regard, the system then advances to a decision block 156 and determines whether the dasher motor load has reached a threshold. If no, the system continues to process the product mix. On the other hand, if the system determines that the motor load is at the threshold, the system advances to a block 158 and initiates a viscosity control loop. The viscosity control loop operates to control product viscosity by monitoring the dasher motor load. In other words, increased product viscosity is detected by monitoring increased motor load. When the dasher motor load increases to a selected level, the electronic controller applies appropriate control signals to the refrigeration system based on input information supplied by the dasher motor. For example, when the system detects a decreased dasher motor load, then the system responds by applying increased refrigeration. On the other hand, if the motor load increases, less refrigeration is required. The system is placed in a recirculation mode denoted by a next block 160 so that the product exiting the freezing cylinder is recirculated through the system to reduce the temperature of the downstream piping.

The freezing system operates in this configuration until all of the piping and equipment downstream of the freezing cylinder are cooled to the desired production temperature. The system then advances to a decision block 162 and determines whether appropriate operator input has been selected to initiate a RUN cycle. If yes, the system advances to a next block 164. At block 164, the mix pump is actuated. At the same time, the tank shut-off valve is opened. The system then advances to a next block 166 and initiates a mix flow loop timer. The system then advances to a decision block 168 and determines whether the mix flow loop enable interval has elapsed. In this regard, the mix flow loop is enabled after a delay since there is typically a surge in the system on recharge. Likewise, the tank shut-off valve may be opened after a delay to permit the system to settle when initiating the forward flow mode. If at decision block 168 the system determines that the interval has elapsed, the system advances to a next block 178 and enables the mix flow control loop. Forward flow is then accomplished by a temperature set point downstream or operator intervention.

Thus, during the operation of a product run cycle, the input mix pump 36 is actuated and controls the freezing cylinder pressure after the tank shut-off valve 32 is open. The divert valve 62 is also set to a nondivert mode and recirculation is discontinued. The output discharge pump 58 supplies processed product to the equipment downstream. In this regard, the discharge pump controls product flow through the system with a variable speed drive that receives control signals from the electronic controller based on input signals received from the mix flow meter 38.

As described above, air is also rationed into the product mix input stream in accordance with the signal supplied by the mix flow meter. Likewise, the pre-aerator operates when mix flow is present. At the same time, the refrigeration apparatus 16 operates under control of the dasher motor load requirements.

Figure 5:
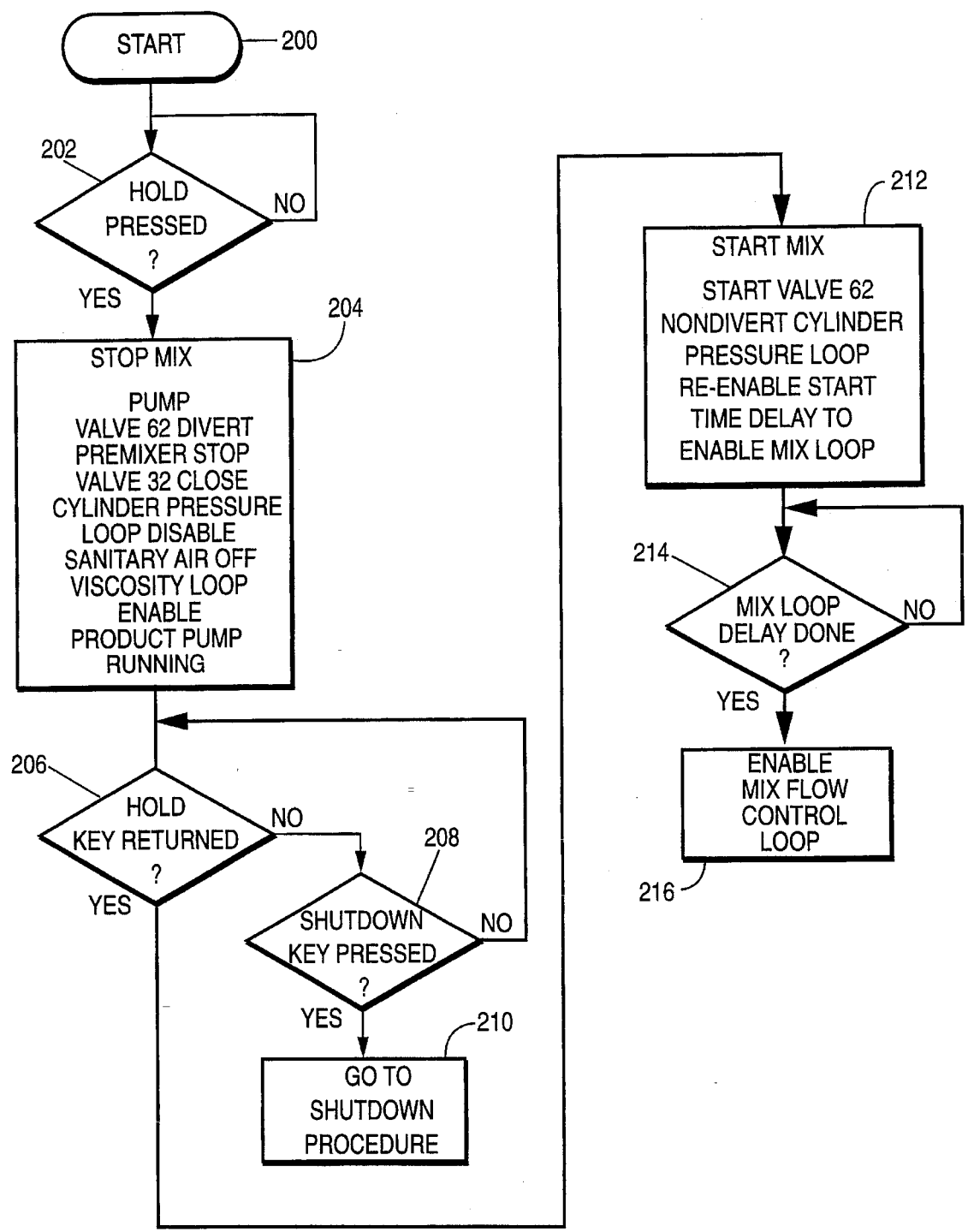
FIG. 5 is a logical flow diagram for operation of a refrigeration system in a HOLD mode.

The system may also operate under a HOLD cycle as shown in FIG. 5. This may occur, for exampled when a problem is experienced downstream of the freezing system 10. In order to initiate recirculation in this case, the system begins at a block 200 and advances to a decision block 202. At decision 202, the system determines whether the operator has input a HOLD interrupt command. If yes, the system advances to a next block 204 to go back into a recirculation mode. The system provides appropriate control signals to deactuate the mix pump 36. The system also places the divert valve to the divert position. The preaerator is also deactuated and the tank shut-off valve is closed. Likewise, the cylinder pressure control loop is disabled and airflow is turned off. The output discharge pump still operates and the refrigeration system is controlled by the dasher motor load requirements.

The system then advances to a decision block 206 and determines whether the HOLD command is still being input by the operator. If no, the system advances to a decision block 208 and determines whether a shutdown request is input by the operator. If yes, the system advances to a block 210 and initiates a shutdown procedure. If at decision block 208 the system determines that a shutdown operation is not requested, the system returns to decision block 206.

On the other hand, if at decision block 206, the system determines that the HOLD input command is no longer requested, the system advances to a block 212 and actuates the mix pump 36. The system also moves the divert valve 62 to the nondivert position. In addition, the system enables the freezing cylinder pressure loop and a time delay for enabling the product mix loop. The system then advances to a decision block 214 and determines whether the time delay for initiating the product mix loop has elapsed. If yes, the system advances to a next block 216 and begins forward flow of product, as described above in connection with FIG. 4.

When the system operates in the forward flow or RUN mode, recirculated product is maintained in the recirculation line 64. Inasmuch as the product in the recirculation line 64 is maintained at a relatively low temperature, it may reside in the recirculation line until a next recirculation operation is initiated. In typical food processing operations, product in the recirculation line is brought to a temperature of about 22° F. so that, when periodic HOLD or RESTART cycles are initiated, the product residing in the recirculation line does not warm to a temperature above approximately 30° F. Alternatively, a further divert line may be connected between the recirculation line and the freezing cylinder 14. In this way, the product residing in the recirculation line may be displaced via air through the additional divert line into the freezing cylinder.

Accordingly, a recirculation system meeting the aforestated objectives has been described in terms of a number of preferred embodiments and the features thereof. Those features which are deemed to be novel are set forth with particularity in the appended claims. Such modifications and alterations as would be apparent to those skilled in the art and familiar with the teachings herein are also deemed to fall within the spirit and scope of the present invention. For example, multiple freezing apparatus, each with recirculation sections as described herein, may be disposed in parallel relation for appropriate sizing of the production line.

What is claimed is:

1. A system for processing frozen product comprising:

a freezing section disposed to receive unprocessed product at an inlet and to supply processed product at an outlet;

an inlet section connected with the freezing section inlet operable to supply a selected amount of unprocessed product to the freezing section inlet;

an outlet section coupled between the freezing section outlet and a downstream location, the outlet section including means for withdrawing processed product from the freezing section and passing the processed product to the downstream location;

a recirculation section coupled with the outlet section and the freezing section inlet, the recirculation section including a diverter valve operable, upon receipt of a first control signal, in a first position to permit processed product to exit the outlet section and operable, upon receipt of a second control signal, in a second position to supply processed product through at least a portion of the outlet section, through the recirculation section and to the freezing section inlet in order to reduce the temperature of the portion of the outlet section; and a control circuit including sensing means for sensing selected parameters of the product and providing a sensing signal for selectively providing the first and second control signals to the diverter valve in response to the sensing signal.

2. The invention as in claim 1 wherein the inlet section comprises:

a product mix supply;

a mix pump coupled with the product mix supply and the control circuit for controlling the pressure developed in the freezing section upon receipt of a third control signal from the control circuit.

3. The invention as in claim 2 wherein the mix pump is a positive displacement pump.

4. The invention as in claim 3 wherein the outlet section further comprises a product discharge pump disposed in close relation to the freezing section outlet and coupled with the control circuit operating at a variable speed to control the flow of product through the freezing section upon receipt of a fourth control signal from the control circuit.

5. The invention as in claim 4 wherein the mix pump is a centrifugal pump and wherein the inlet section further comprises a mix flow meter coupled with the mix pump disposed to monitor the amount of product provided by the mix pump.

6. The invention as in claim 2 wherein the mixed pump is a centrifugal pump and wherein the inlet section further comprises a mix for meter coupled with the mix pump disposed to monitor the amount of product provided by the mix pump.

7. The invention as in claim 1 wherein the freezing section comprises a freezing cylinder, a dasher disposed in the freezing cylinder, and a drive unit operable to rotate the dasher.

8. The invention as in claim 7 wherein the sensing means is coupled with the drive unit and is disposed to provide a sensing signal when the load on the drive unit exceeds a selected value.

9. The invention as in claim 8 wherein the control circuit includes an electronic controller coupled with the sensing means.

10. The invention as in claim 8 wherein the sensing means further includes a temperature sensor disposed in the freezing section providing a signal indicative of freezing cylinder temperature.

11. The invention as in claim 1 wherein the sensing means includes a temperature sensor disposed in the freezing section providing a signal indicative of freezing cylinder temperature.

12. The invention as in claim 1 wherein the sensing means includes a transducer disposed in the inlet section providing signals indicative of the pressure applied by the unprocessed product in the inlet section.

13. The invention as in claim 9 wherein the inlet section includes a preaerator disposed in the inlet section for mixing a selected amount of air with the unprocessed product.

14. The invention as in claim 13 further comprising an air mass flow controller coupled with the electronic controller and the preaerator disposed to provide flow control signals to the preaerator.

15. A method for initiating a start-up operation in a system for processing frozen product, the system including a freezing cylinder with an inlet and an outlet, an inlet section supplying unprocessed product to the freezing cylinder inlet, an outlet section receiving processed product from the freezing cylinder, a recirculation section selectively coupled with the outlet section and the freezing cylinder inlet, and a sensing and control circuit providing control signals to the recirculation section, the method including the steps of:

supplying unprocessed product from the inlet section to the freezing cylinder inlet, processing the product in the freezing cylinder, passing the processed product from the freezing cylinder through the outlet section, sensing characteristics of the processed product with the sensing and control circuit, providing first control signals to the recirculation section for selectively coupling the recirculation section with the outlet section and the freezing cylinder inlet, recirculating the processed product from the outlet section to the freezing cylinder inlet at least for a selected period of time until the temperature of the outlet section is reduced to a desired level, providing second control signals to the recirculation section for decoupling the recirculation section between the outlet section and the freezing cylinder inlet, and thereafter passing the processed product from the freezing cylinder through the outlet section and to a downstream location.

16. A method for operating a system for processing frozen product including a freezing cylinder with an inlet and an outlet, an inlet section supplying unprocessed product to the freezing cylinder inlet, an outlet section receiving processed product from the freezing cylinder, a recirculation section selectively coupling the outlet section and the freezing cylinder inlet, and control means for providing control signals to the recirculation section, the method including the steps of:

supplying unprocessed product from the inlet section to the freezing cylinder inlet, processing the product in the freezing cylinder, passing the processed product from the freezing cylinder through the outlet section, sensing the viscosity of the processed product with the control means, providing first control signals to the recirculation section for selectively coupling the outlet section with the freezing cylinder inlet, recirculating the processed product from the outlet section to the freezing cylinder inlet, determining when the viscosity of the processed product exceeds a threshold value, and providing second control signals to the recirculation section for decoupling the outlet section and the freezing cylinder inlet.

* * * * *